(12) United States Patent
Srinivasan

(10) Patent No.: US 8,448,219 B2
(45) Date of Patent: May 21, 2013

(54) SECURELY HOSTING WORKLOADS IN VIRTUAL COMPUTING ENVIRONMENTS

(75) Inventor: Kattiganehalli Y. Srinivasan, Princeton Junction, NJ (US)

(73) Assignee: Novell, Inc., Provo, UT (US)

( * ) Notice: Subject to any disclaimer, the term of this patent is extended or adjusted under 35 U.S.C. 154(b) by 610 days.

(21) Appl. No.: 12/428,572

(22) Filed: Apr. 23, 2009

(65) Prior Publication Data

US 2010/0275241 A1 Oct. 28, 2010

(51) Int. Cl.
*H04L 29/06* (2006.01)

(52) U.S. Cl.
USPC ........ 726/1; 726/6; 718/1; 718/101; 718/104; 718/105

(58) Field of Classification Search
USPC .................. 713/1, 2; 718/1, 2; 726/1, 22
See application file for complete search history.

(56) References Cited

U.S. PATENT DOCUMENTS

| | | | | |
|---|---|---|---|---|
| 6,654,783 | B1 * | 11/2003 | Hubbard | 709/202 |
| 7,356,679 | B1 | 4/2008 | Le et al. | |
| 7,734,785 | B2 * | 6/2010 | zu Bexten et al. | 709/226 |
| 7,996,842 | B2 * | 8/2011 | Savit | 718/104 |
| 2007/0006294 | A1 * | 1/2007 | Hunter | 726/14 |
| 2008/0005798 | A1 | 1/2008 | Ross | 726/26 |
| 2008/0040716 | A1 * | 2/2008 | Lam et al. | 718/1 |
| 2008/0046960 | A1 * | 2/2008 | Bade et al. | 726/1 |
| 2008/0301692 | A1 * | 12/2008 | Billau et al. | 718/104 |
| 2009/0083404 | A1 | 3/2009 | Lenzmeier et al. | |

OTHER PUBLICATIONS

DMTF Inc—Publication Sep. 2008—OVF Technical Note.*
Douglas Thain et al: "Distributed Computing in Practice: The Condor Experience". Concurrency and Computation: Practice and Experience; Wiley, London; vol 17, Jan. 1, 2005, pp. 2-4.
DMTF: "Open Viftualization Format Specification" Internet Citation (www.cirntforgistandardsipublished documentsiD3P0243 1.0.0.pdf) Feb. 22, 2009, pp. 1-41.
VMWare: "VMWare Virtual Center. User's Manual", Users Manual VMWare Workstation, pp. 215-232, Jul. 6, 2006.
"Enabling Portability & Simplified Deployment of Virtual Appliances" Internet citation (vvww.dmtf.orgfinitiativesivman initiative/ OVF Tech Note Digital.pdf Sep. 1, 2008, pp. 1-3.
VMWare et al: "VMWare Workstation 5 Users Manual"Internet article (www.vmware.com/pdf/ws5 manual.pdf).
EP10159421 European Search Report dated Jun. 10, 2010.
EP10159421 Examination Report dated Jun. 10, 2010.
Douglas Thain et al: "Distributed Computing in Practice: The Condor Experience" Concurrency and Computation: Practice and Experience, Wiley, London, gb LNKD-D0I:10.1.1 .6.3035, vol. 17, Jan. 1, 2005 , pp. 2-4, XP007913206ISSN: 1532-0626.

(Continued)

*Primary Examiner* — Jung Kim
*Assistant Examiner* — Tri Tran
(74) *Attorney, Agent, or Firm* — King & Schickli, PLLC

(57) ABSTRACT

Methods and apparatus involve securely hosting workloads. Broadly, computing workloads are classified according to security concerns and those with common concerns are deployed together on common hardware platforms. In one instance, security tags are bi-modally attached or not to workloads meeting a predetermined security threshold. Those with tags are deployed on a common machine while those without tags are deployed on other machines. Tags may be embedded in meta data of open virtual machine formats (OVF). Considerations for re-booting computing devices are also contemplated as are multiplexing workloads. Computer program products are further disclosed.

10 Claims, 6 Drawing Sheets

OTHER PUBLICATIONS

DMTF: "Open Virtualization Format Specification" Internet Citation Feb. 22, 2009, pp. 1-41, XP007913208 Retrieved from the Internet:URL:http://www.dmtf.orgfistandards/published_documents/ DSP0243_1.0.0.pdf.

VMWare: "VMWare Virtual Center. User's manual" Jul. 6, 2006, User'S Manual VMWare Workstation, XX, XX, pp. 215-232, XP002487402.

"Enabling Portability & Simplified Deployment of Virtual Appliances" Internet Citation Sep. 1, 2008, pp. 1-3, CP007913207 Retrieved from the Internet:URL:http://www,dmiforgiinitiativesivman_initiative/OVF_Tech_Note_Digital.pdf.

VMWare et al: "VMWare Workstation 5 User's Manual" Internet )Article, [Online] Sep. 16, 2005, pp. 1-158, XP002492725 Retrieved from the Internet:URL:http://www.vmware.corn/pdf/ws5_manual.pdf.

http://www.smartdeploy.com/ProductsNMexpressivmexpressdatasheet,pdf Prowess VM Express "Highly Efficient Virtual Machine Distribution" ©2008 Prowess Solutions; 2 Pages.

http://vee08.cs.tcd.ie/slides/p49-talk.pdf IBM Research, Hawthorne, Ny "Opening Black Boxes: Using Semantic Information to Combat Virtual Machine Image Sprawl" Darrell Reimer, Arun Thomas, Glenn Ammons, Todd Mummert, Bowen Alpern, Vasanth Bala Mar. 6, 2008: 28 Pages.

http://www.vmware.com/pdflovf_whitepaper_specification.pdf "The Open Virtual Machine Format Whitepaper for Ovf Specification" Copyright @ 2007 VMware, Inc. and XenSource, Inc. 16 Pages.

* cited by examiner

SECURELY HOSTING WORKLOADS IN VIRTUAL COMPUTING ENVIRONMENTS

FIELD OF THE INVENTION

Generally, the present invention relates to computing devices and environments involving computing workloads. Particularly, although not exclusively, it relates to securely hosting the workloads, including hosting workloads with common security or isolation concerns. Other features contemplate computing arrangements, policies, workload multiplexing, and computer program products, to name a few.

BACKGROUND OF THE INVENTION

While hosting computing workloads as virtual machines is rapidly becoming the norm in business enterprises, security remains a major concern for highly sensitive workloads. By definition, a virtualized environment is a multi-tenant environment and consequently has additional vulnerabilities when compared to a traditional deployment model where resources are dedicated to the workload. For instance, in a virtualized deployment, both hardware and software resources are shared across workloads and one virtual machine could compromise another virtual machine by leaking or affecting sensitive information. In such a scenario, consider a physical platform that is hosting both a web based infrastructure and a payroll application at the same time. During use, any vulnerabilities (e.g., viruses, keystroke programs, PIN stealing malware, etc.) introduced by the web based infrastructure can potentially impact the payroll application since the two share a same computing device. (Namely, a hypervisor coupled with a management domain multiplexes the hardware resources (e.g., processor, memory, disk storage, etc.) and software resources (e.g., I/O drivers) amongst the two virtual machines.) Given the significant amount of a software stack that is shared across the workloads (all of the management domain and the physical I/O infrastructure is shared), even in situations with no compromise it is difficult to prove that there has not been an information leak from one workload to the other.

Accordingly, a need exists in the art of computing for securely hosting workloads in a provably secure fashion. The need further contemplates a system that can maintain flexibility offered in virtual environments, including wide ranging hosting options with varied levels of workload isolation. Even more, the need should extend to using the virtualization infrastructure to mimic the traditional hosting infrastructure. Any improvements along such lines should further contemplate good engineering practices, such as simplicity, ease of implementation, unobtrusiveness, stability, etc.

SUMMARY OF THE INVENTION

The foregoing and other problems become solved by applying the principles and teachings associated with the hereinafter-described securely hosting workloads in a virtual computing environment. Broadly, methods and apparatus co-locate workloads together that have common security and isolation concerns. At a time when workloads are to be deployed to physical platforms, a deployment engine ensures consolidation of workloads having similar security attributes on a same physical node.

In one embodiment, computing workloads are classified according to security concerns and those with common concerns are deployed together on common hardware platforms. Representatively, security tags are bi-modally attached or not to workloads meeting a predetermined security threshold. Those with tags are then deployed on a common machine while those without tags are deployed on other machines. Tags may be embedded in meta data of open virtual machine formats (OVF) and bimodal operation provides simplicity. Tags may be also established according to computing policies of an entity, such as whether or not information related to the workload is financial, personnel or otherwise sensitive, whether or not the workload will be subject to wide- or limited-access from other computing devices, i.e., a website or in-house program, whether or not the workload will be accessible to many or a limited number of persons, e.g., management persons versus any employee, etc. Of course, many computing policies are possible for establishing the threshold.

Appreciating that a hardware platform may be already hosting a workload, or may be idle, further considerations are contemplated for re-booting computing devices. That is, if a workload with a security tag already exists on a hardware platform, a second workload with its own security tag can be straightaway deployed to the same platform. Conversely, if the platform is idle, or has no present workload, the platform can be re-booted to a pristine state before deployment of a first workload. In either situation, a provably secure fashion is provided for hosting workloads.

Appreciating that various foregoing options will restrict hosting options and, in environments with limited hardware resources, it is possible to have situations where the co-location constraints may result in poor resource utilization. For an important class of workloads that are non-interactive, features of the invention further propose a workload multiplexing scheme that can improve resource utilization.

In accomplishing any of the foregoing, at least first and second computing devices have a hardware platform with a processor, memory and available storage upon which a plurality of virtual machines are configured under the scheduling control of a hypervisor. The virtual machines have computing workloads classified according to a predetermined level of security and only those workloads meeting a predetermined level of security are deployed together on the first computing device while only those workloads not meeting the predetermined level of security are deployed together on the second computing device. In this manner, common platforms host workloads having common security concerns.

Executable instructions loaded on one or more computing devices for undertaking the foregoing are also contemplated as are computer program products available as a download or on a computer readable medium. The computer program products are also available for installation on a network appliance or an individual computing device.

These and other embodiments of the present invention will be set forth in the description which follows, and in part will become apparent to those of ordinary skill in the art by reference to the following description of the invention and referenced drawings or by practice of the invention. The claims, however, indicate the particularities of the invention.

BRIEF DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE ILLUSTRATED EMBODIMENTS

In the following detailed description of the illustrated embodiments, reference is made to the accompanying drawings that form a part hereof, and in which is shown by way of illustration, specific embodiments in which the invention may be practiced. These embodiments are described in sufficient detail to enable those skilled in the art to practice the invention and like numerals represent like details in the various figures. Also, it is to be understood that other embodiments may be utilized and that process, mechanical, electrical, arrangement, software and/or other changes may be made without departing from the scope of the present invention. In accordance with the present invention, methods and apparatus are hereinafter described for securely hosting computing workloads.

Figure 1:
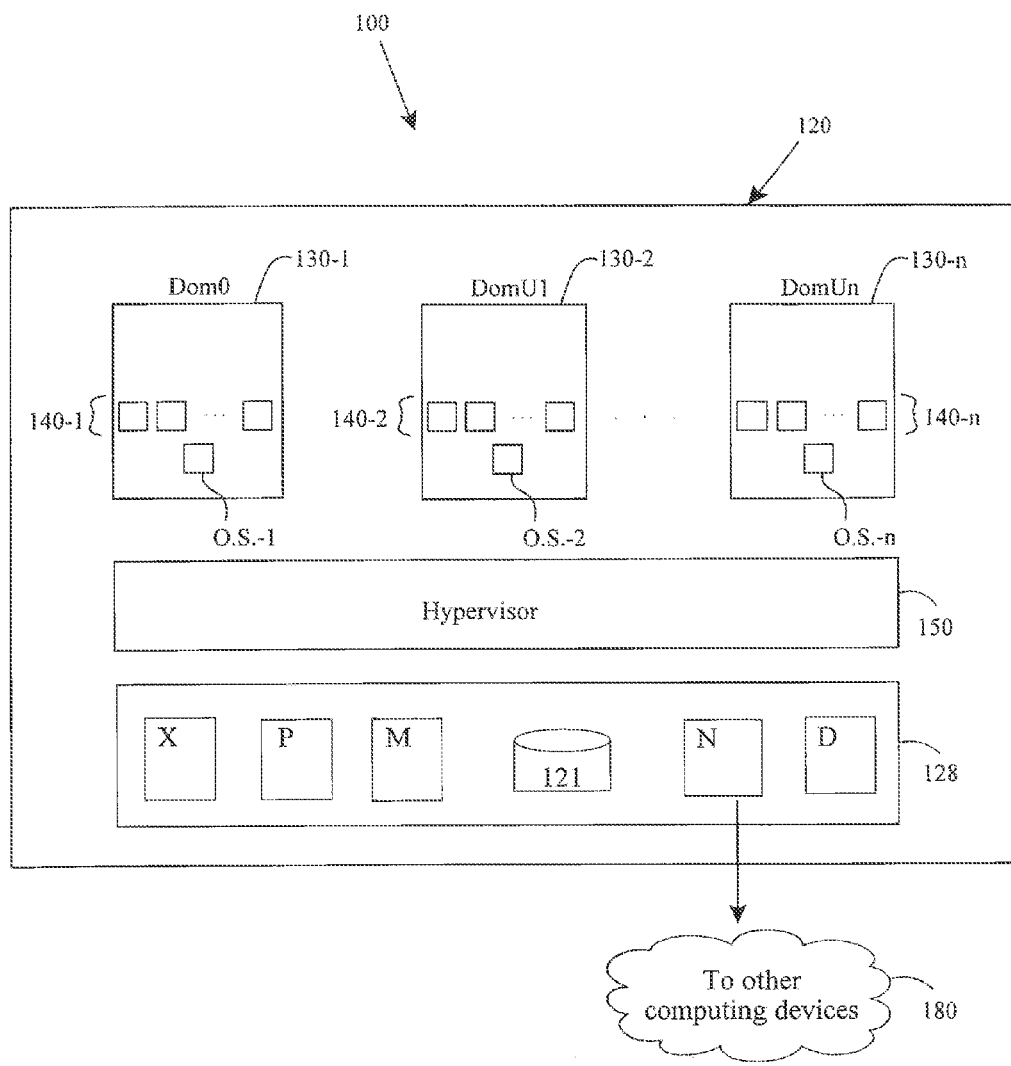
FIG. 1 is a diagrammatic view in accordance with the present invention of a basic computing device for securely hosting workloads.

With reference to FIG. 1, a computing system environment 100 includes a computing device 120. Representatively, the device is a general or special purpose computer, a phone, a PDA, a server, a laptop, etc., having a hardware platform 128. The hardware platform includes physical I/O and platform devices, memory (M), access to remote or local storage drives 121, processor (P), such as a CPU(s), USB or other interfaces (X), drivers (D), etc. In turn, the hardware platform hosts one or more virtual machines in the form of domains 130-1 (domain 0, or management domain), 130-2 (domain U1), . . . 130-n (domain Un), each having its own guest operating system (O.S.) (e.g., Linux, Windows, Netware, Unix, etc.), applications 140-1, 140-2, . . . 140-n, file systems, etc.

An intervening Xen or other hypervisor layer 150, also known as a "virtual machine monitor," or virtualization manager, serves as a virtual interface to the hardware and virtualizes the hardware. It is also the lowest and most privileged layer and performs scheduling control between the virtual machines as they task the resources of the hardware platform, e.g., memory, processor, storage, network (N) (by way of network interface cards, for example), etc. The hypervisor also manages conflicts, among other things, caused by operating system access to privileged machine instructions. The hypervisor can also be type 1 (native) or type 2 (hosted). According to various partitions, the operating systems, applications, application data, boot data, or other data, executable instructions, etc., of the machines are virtually stored on the resources of the hardware platform.

In use, the representative computing device 120 is arranged to communicate 180 with one or more other computing devices or networks. In this regard, the devices may use wired, wireless or combined connections to other devices/networks and may be direct or indirect connections. If direct, they typify connections within physical or network proximity (e.g., intranet). If indirect, they typify connections such as those found with the internet, satellites, radio transmissions, or the like. The connections may also be local area networks (LAN), wide area networks (WAN), metro area networks (MAN), etc., that are presented by way of example and not limitation. The topology is also any of a variety, such as ring, star, bridged, cascaded, meshed, or other known or hereinafter invented arrangement.

Figure 2:
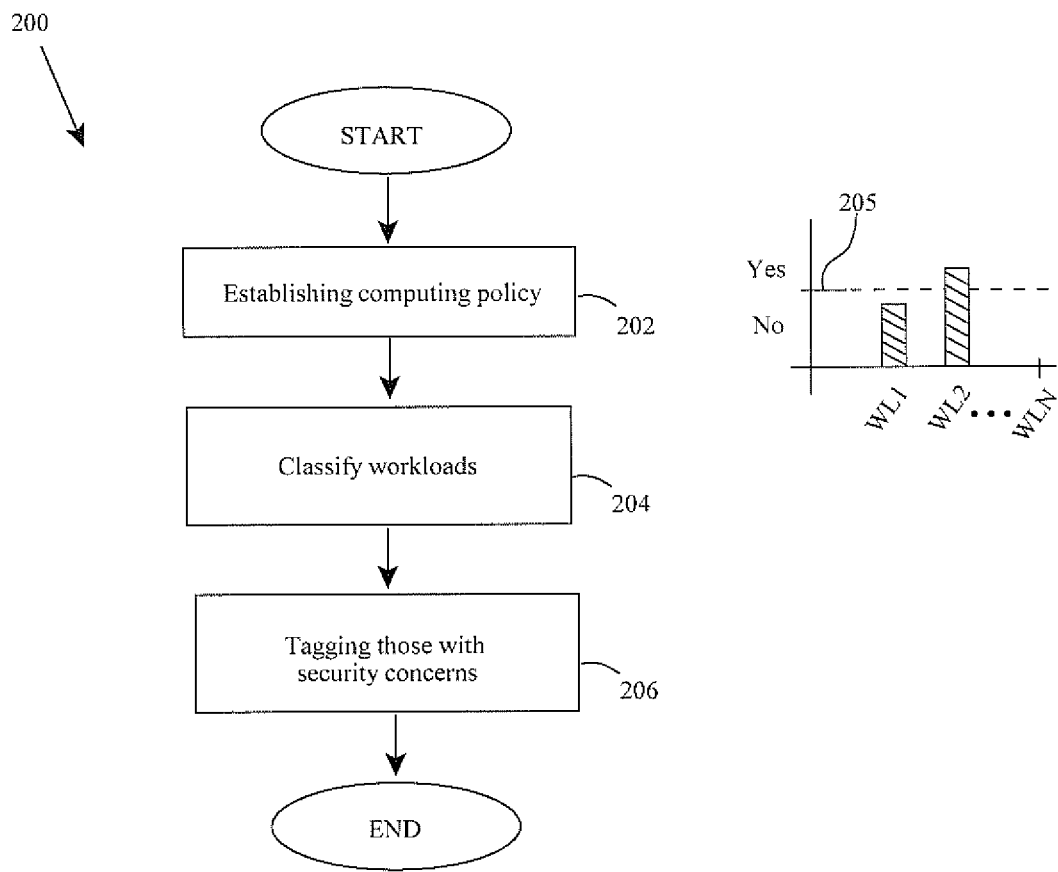
FIGS. 2 and 4 are flow charts in accordance with the present invention for securely hosting workloads on a computing devices such as that in FIG. 1.

Leveraging the foregoing, FIG. 2 shows a high-level flow 200 for securely hosting workloads on computing devices such as shown in FIG. 1. Broadly, the flow includes first establishing a computing policy, step 202. In this regard, computing policy can be a predetermined threshold 205, above which, workloads (WL) are deemed to require some measure of security. As before, this can include determining whether or not information related to the workload is financial, personnel or otherwise sensitive, whether or not the workload will be subject to wide- or limited-access from other computing devices, i.e., a website or internal financial spreadsheets, whether or not the workload will be accessible to many or a limited number of persons, e.g., management persons versus any employee, etc.

At step 204, each of the computing workloads of the enterprise are classified based on this policy. Also, this can be done automatically or by humans, or both. For instance, a committee of people can meet to determine which software applications have sensitive information, e.g., personnel or financial records, and require limited access. Conversely, a computer can automatically adjudicate a workload as being a website host by examining an IP address. In either event, those workloads classified as meeting the predetermined level of security are then tagged or otherwise flagged, identified, etc. to distinguish them from non-tagged workloads, step 206. In this manner, workloads become classified based on security and need for isolation. Then, at the time when a workload is to be deployed to an actual hardware platform, a deployment engine can ensure that only workloads of similar security attributes are consolidated on a common physical node. Advantageously, traditional data centers are already structured to deploy to dedicated servers and networks according to items such as workload balancing, computing temperature, etc., and now security concerns can be easily added to the list of deployment considerations.

Figure 3:
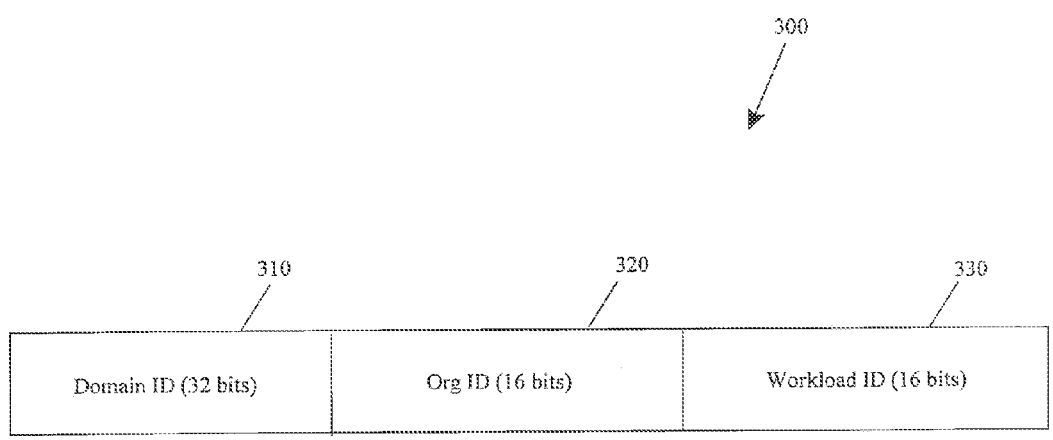
FIG. 3 is a diagrammatic view in accordance with the present invention of a representative security tag.

With reference to FIG. 3, one representative example of a tag to identify workloads is given generally as 300. It could be embedded in a workload descriptor to be used in determining the appropriate physical host at the point of deployment. In this example, at 310, a domain identification is given, such as for the enterprise employing the workload which serves to distinguish from other enterprises in the context of a "cloud" computing environment. At 320, an originating identification could be given, such as for the particular department in the enterprise that owns or otherwise controls the workload, e.g., finance department, marketing department, etc. At 330, the actual workload identification could be given, such as a particular software application for the finance or marketing department, etc. Also, the security tag can be embedded as part of the meta data in the OVF (open virtual machine format).

Ultimately, the approach of tagging a workload or not, no matter how actually tagged, results in a bimodal security process thereby exalting simplicity. Namely, a tagged workload means that it is sensitive enough to require co-locating on a common hardware platform (FIG. 1) with other workloads also having a tag while non-tagged workloads have no co-locating restrictions. In other words, if no security tag is present, the implication is that the workload has no co-locating restrictions and determining the host can be based on other parameters such as performance and expected quality of service. If a workload is tagged as having a co-location restriction, on the other hand, it can only be hosted on servers or other computing devices that are either currently free (e.g., idle, not hosting any workload) or hosting workloads that have a matching co-location tag.

Figure 4:
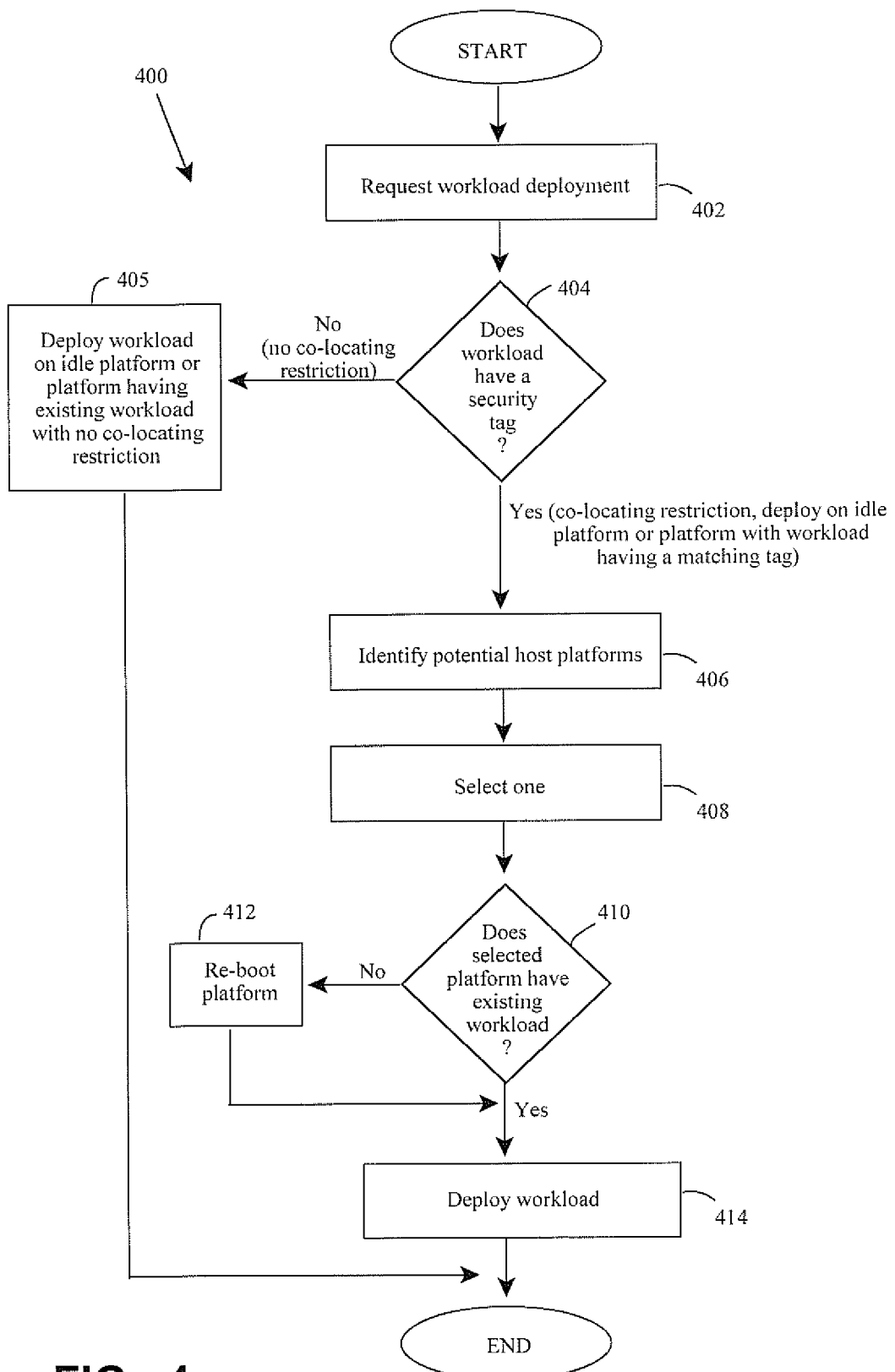

In more detail, FIG. 4 shows the flow 400 as follows. At step 402, a request for a workload to be deployed is received by a deployment engine of a data center, for example. At step 404, the requested workload is examined to determine whether or not it has a tag. If not, the workload has no co-locating restriction, meaning it has not met any predetermined level of security concern, and can be deployed straightaway to an idle platform or a platform already hosting a workload with no co-locating restriction, step 405.

Alternatively, if the workload is indeed tagged at step 404, a set of potential hosts platforms are identified, step 406. In this regard, a potential host may be identified by examining constraints of the platform, such as an operating system, available storage, etc., that conform or meet requirements of the to-be-hosted workload. Of those, at step 408, at least one potential host is selected and examined for its existing workload, step 410. If its existing workload is already operating and has a co-location requirement, the host is known to already meet relative security concerns and the new workload can be straightaway deployed, step 414.

Conversely, if no existing workload is running on the host, the host is re-booted to revert its operating state to a pristine state. This ensures that any vulnerabilities that may have been introduced into the host in the past will not affect the workload that is to be hosted. In this regard, much of the dom0 state (FIG. 1) is immutable and indeed. Novell's Virtualization Platform (NVP) keeps this state in a read-only file system. Then, once the host is properly initialized, the corresponding mutable state is saved so that the pristine state can be constructed very efficiently. This structuring of dom0 (as is done in NVP) allows the pristine state to be achieved rapidly. Then, the new workload is deployed, step 414.

Figure 5:
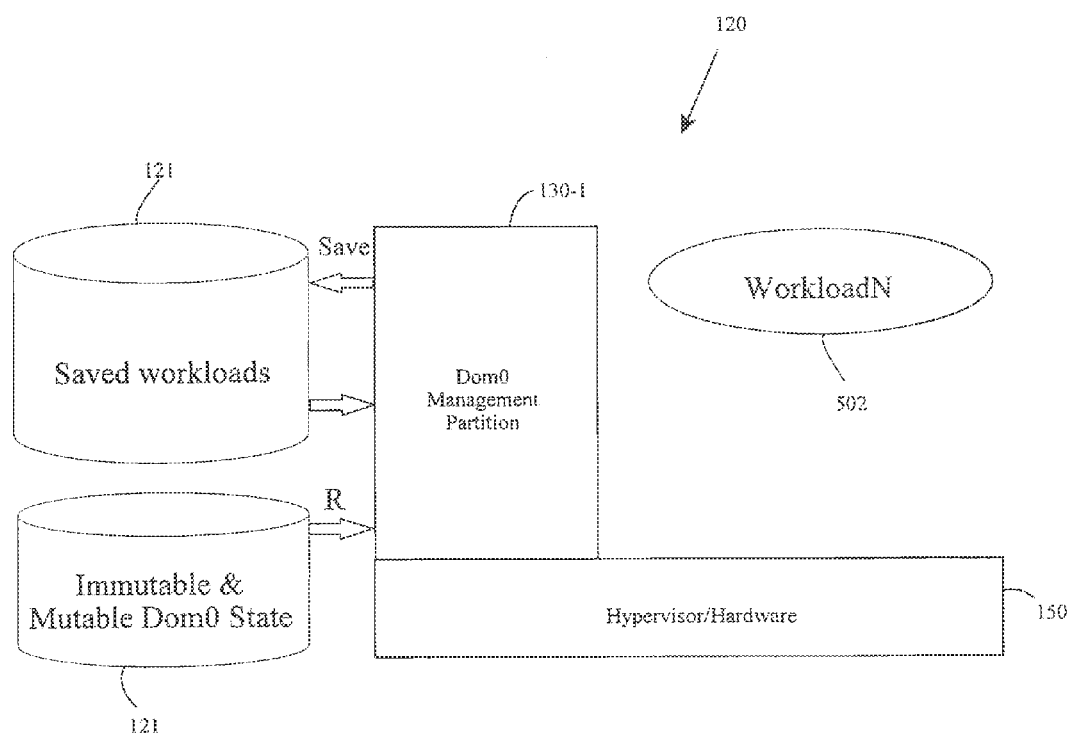
FIG. 5 is a combined diagrammatic view and flow chart in accordance with the present invention for multiplexing workloads for the secure hosting thereof.

With reference to FIG. 5, skilled artisans will appreciate that the options presented above indeed place restrictions on hosting. In environments with limited hardware resources, however, situations may arise where the co-location constraints cause poor resource utilization which somewhat defeats the advantages of virtual machines. Thus, for an important class of workloads that are non-interactive, a further feature of the invention contemplates a workload multiplexing scheme that can improve resource utilization.

Namely, a hypervisor 150 multiplexes the physical resources amongst the hosted virtual machines, as before. Also, most virtualization platforms 120 support the operations to save and restore virtual machines. The save operation snapshots the memory image of the virtual machine while the restore (R) operation restores the memory image of a previously saved virtual machine. These two primitives can be used by the management domain (orchestrating) software to ensure proper workload isolation (based on the co-location tag) as described earlier.

During use, at any given instance in time, the workload 502 hosted either does not have any co-location restriction or satisfies the co-location constraint. In turn, these conforming workloads can be switched in and out of the hardware platform as a unit to assure workload isolation. Then, when a more restrictive workload is switched in, Dom0 state is reverted to the pristine state. The context switching proposed here is a fairly heavy-weight operation and to minimize the relative cost of this operation, workload(s) that are switched in should be allowed to execute for a period that is significantly larger than the time it takes to switch.

Figure 6:
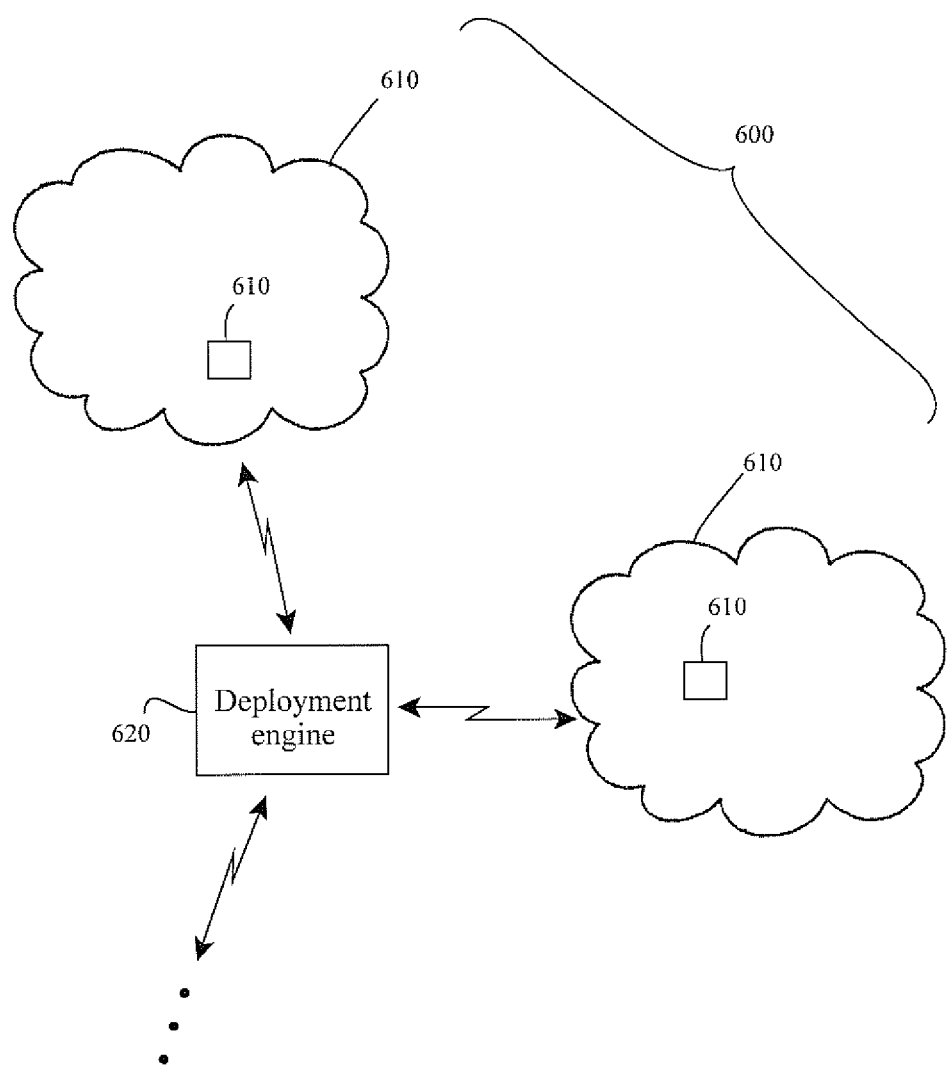
FIG. 6 is a diagrammatic view in accordance with the present invention of a data center environment for securely hosting workloads.

With reference to FIG. 6, the features of the invention can be replicated many times over in a larger computing environment 600, such as a "cloud" environment or a large enterprise environment. For instance, multiple data centers 610 could exist that are each connected by way of a deployment engine 620. In turn, each data center could include individual computing devices 120 and their attendant structures in order to securely host workloads thereon, that are deployed by way of the deployment engine. In turn, the computing policies 202, FIG. 2, for deployment could be centrally managed by the engine and could further include scaling to account for competing interests between the individual data centers. Other policies could also exist that harmonize the events of the data centers. Alternatively still, each data center could have its own deployment engine. Nested hierarchies of all could further exist.

In still other embodiments, skilled artisans will appreciate that enterprises can implement some or all of the foregoing with humans, such as system administrators, computing devices, executable code, or combinations thereof. In turn, methods and apparatus of the invention further contemplate computer executable instructions, e.g., code or software, as part of computer program products on readable media, e.g., disks for insertion in a drive of computing device, or available as downloads or direct use from an upstream computing device. When described in the context of such computer program products, it is denoted that items thereof, such as modules, routines, programs, objects, components, data structures, etc., perform particular tasks or implement particular abstract data types within various structures of the computing system which cause a certain function or group of function, and such are well known in the art.

Lastly, although the foregoing has been described in terms of specific embodiments, one of ordinary skill in the art will recognize that additional embodiments are possible without departing from the teachings of the present invention. This detailed description, therefore, and particularly the specific details of the exemplary embodiments disclosed, is given primarily for clarity of understanding, and no unnecessary limitations are to be implied, for modifications will become evident to those skilled in the art upon reading this disclosure and may be made without departing from the spirit or scope of the invention. Relatively apparent modifications, of course, include combining the various features of one or more figures with the features of one or more of other figures.

The invention claimed is:

1. In a virtual computing system environment, a method of securely hosting workloads on computing devices having a hardware platform, comprising:
    classifying each of a plurality of workloads according to a predetermined level of security;
    attaching a security tag to said each workload meeting a predetermined computing policy threshold set according to the predetermined level of security;
    deploying to a first hardware platform only said workloads having said attached security tag and to a second hardware platform only said workloads not having said attached security tag; and
    thereafter upon a request to add to said second hardware platform said workloads having said attached security tag, saving to disk the only said workloads not having said attached security tag and thereafter restoring a management domain of the second hardware platform to a pristine state.

2. The method of claim 1, further including deploying to the second hardware platform the saved to disk workloads not having said attached security tag and the requested to add said workloads having said attached security tag after said restoring a management domain of the second hardware platform to a pristine state.

3. In a computing system environment, a method of securely hosting workloads on computing devices having hardware platforms, comprising:

classifying each of a plurality of computing workloads according to a predetermined level of security;

deploying to common said hardware platforms only said computing workloads having common said classified levels of security; and thereafter upon a request to add to one of the hardware platforms a workload with a more restrictive level of security, saving to disk any existing workloads of said one of the hardware platforms and restoring a management domain of said one of the hardware platforms to a pristine state.

4. The method of claim 3, further including deploying to said one of the hardware platforms the saved to disk said any existing workloads and the workload with the more restrictive level of security.

5. A computing system to securely host workloads, comprising:

at least first and second computing devices each with a hardware platform having at least a processor, memory and available storage upon which a plurality of virtual machines are configured under the scheduling control of a hypervisor, wherein the plurality of virtual machines have computing workloads classified according to a predetermined level of security and only said computing workloads meeting said classified predetermined level of security are deployed together on the first computing device while only said computing workloads not meeting said classified predetermined level of security are deployed together on the second computing device;

the system being adapted to save to said available storage said computing workloads not meeting the classified predetermined level of security upon a request to deploy to the second computing device computing workloads classified as meeting said predetermined level of security and restore a management domain of said hardware platform of said second computing device to a pristine state.

6. The system of claim 5, wherein the only said computing workloads meeting said classified predetermined level of security that are said deployed together on the first computing device further include a security tag.

7. The system of claim 6, wherein the security tag is embedded in meta data of an open virtual machine format.

8. A computer program product embodied in a non-transitory computer readable medium for loading on a computing device to securely host workloads, the computer program product having executable instructions to ascertain a level of security for each of a plurality of computing workloads of virtual machines, to classify the each of the plurality of computing workloads according to the ascertained level of security, and to deploy to common hardware platforms only said computing workloads having common said levels of security;

the computer program product further having executable instructions to, upon a request to add to one of the hardware platforms a workload classified with a more restrictive level of security than said workloads having common levels of security currently deployed thereon, first save to disk any existing workloads of the one of the hardware platforms and restore a management domain of the one of the hardware platforms to a pristine state.

9. The computer program product of claim 8, further including executable instructions to reboot hardware platforms if no operating workload exists thereon and said computing workloads are designated for deployment thereto.

10. The computer program product of claim 8, further including executable instructions to identify potential host computing devices available for the deployment to said common hardware platforms.

\* \* \* \* \*